No. 701,478. Patented June 3, 1902.
P. FRANTZ.
BALE TIE MACHINE.
(Application filed Oct. 14, 1901.)
(No Model.) 10 Sheets—Sheet 1.

Witnesses:
R. J. Jacker
H. L. Weaver

Inventor:
Peter Frantz,
Walter N. Haskell.
By Atty.

No. 701,478. Patented June 3, 1902.
P. FRANTZ.
BALE TIE MACHINE.
(Application filed Oct. 14, 1901.)
(No Model.) 10 Sheets—Sheet 3.

Witnesses:
R. J. Jacker
J. A. Weaver

Inventor:
Peter Frantz,
Walter N. Haskell.
By Atty.

THE NORRIS PETERS CO., PHOTO-LITHO., WASHINGTON, D. C.

No. 701,478. Patented June 3, 1902.
P. FRANTZ.
BALE TIE MACHINE.
(Application filed Oct. 14, 1901.)
(No Model.) 10 Sheets—Sheet 4.
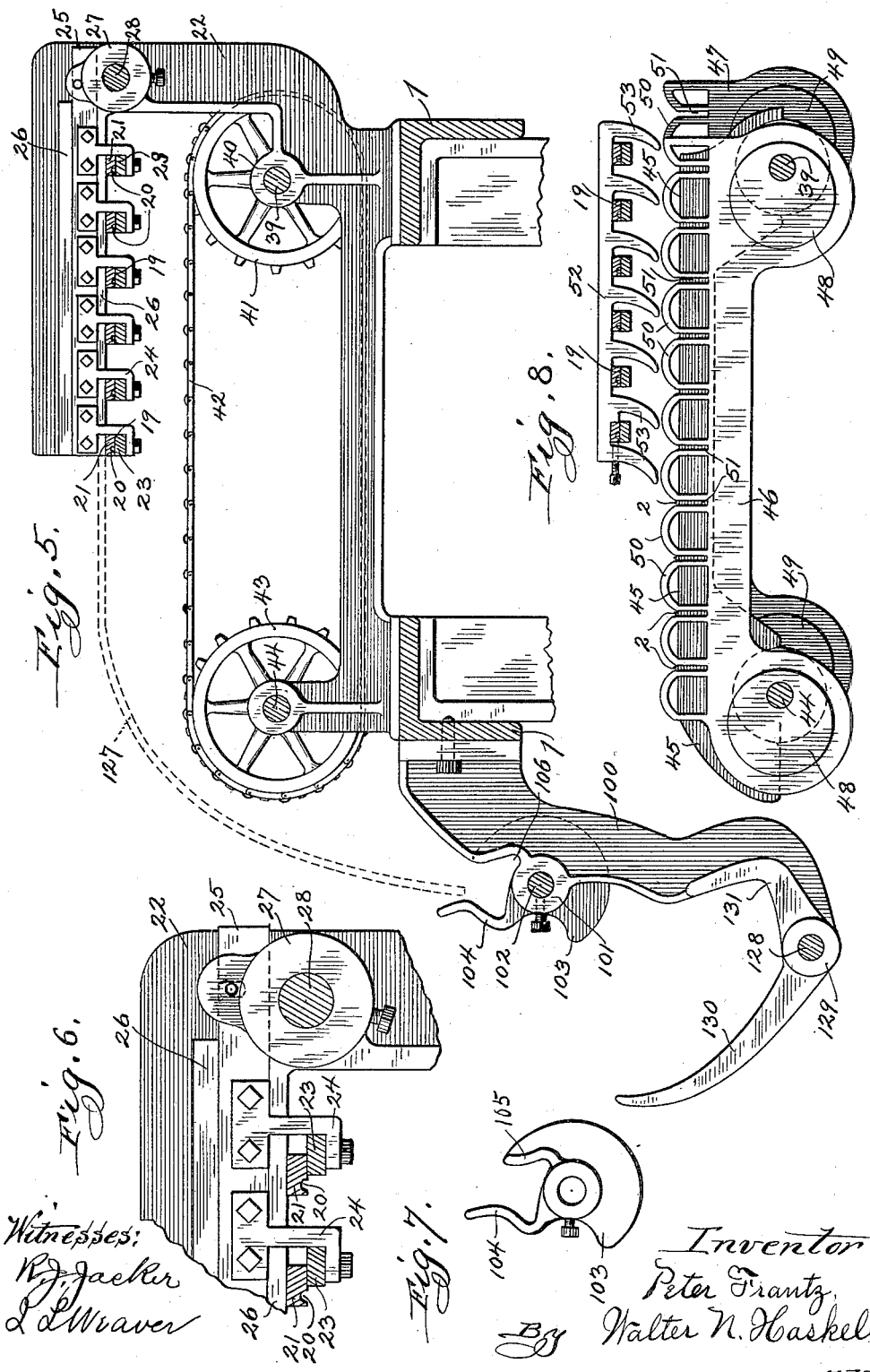
Witnesses:
R. J. Jaeker
L. L. Weaver
Inventor:
Peter Frantz,
By Walter N. Haskell,
Atty.

No. 701,478. Patented June 3, 1902.
P. FRANTZ.
BALE TIE MACHINE.
(Application filed Oct. 14, 1901.)
(No Model.) 10 Sheets—Sheet 5.
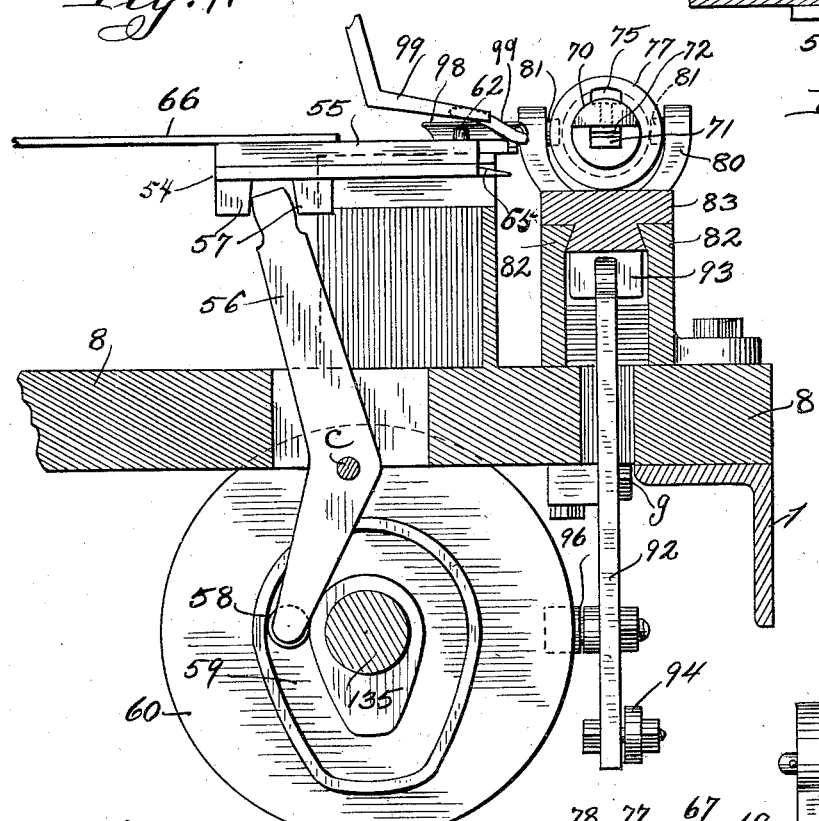
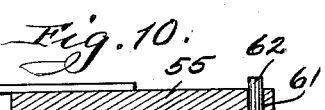
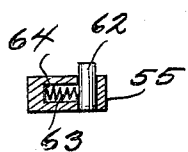
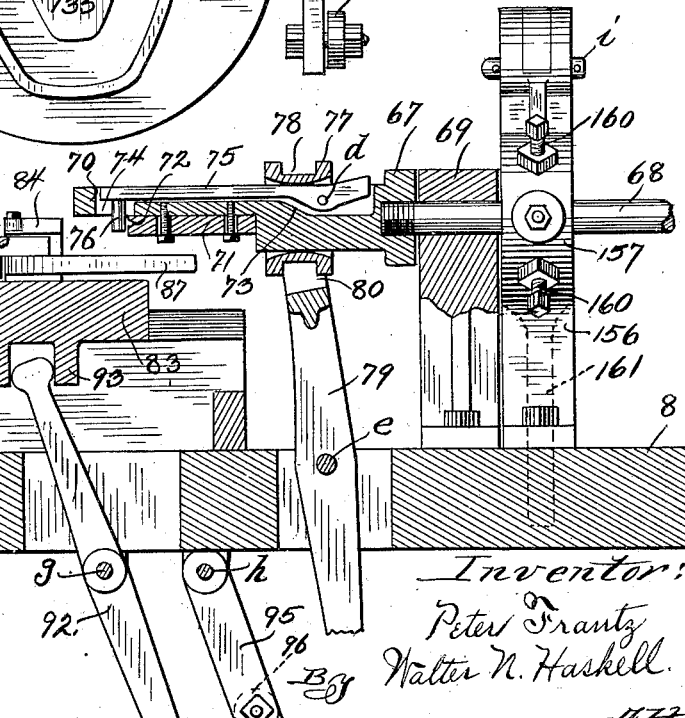
Witnesses: Inventor:
Peter Frantz
Walter N. Haskell No. 701,478. Patented June 3, 1902.
P. FRANTZ.
BALE TIE MACHINE.
(Application filed Oct. 14, 1901.)
(No Model.) 10 Sheets—Sheet 6.

Witnesses:
R. J. Jacker.
J. L. Weaver.

Inventor:
Peter Frantz,
By Walter N. Haskell,
Atty.

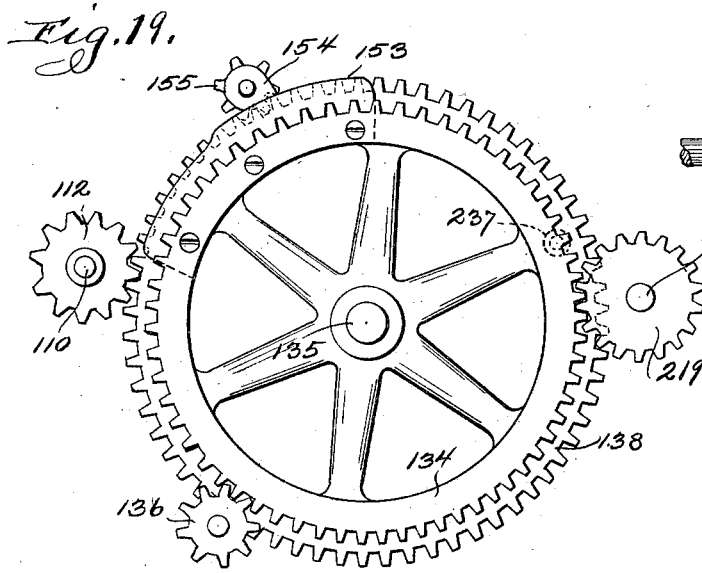
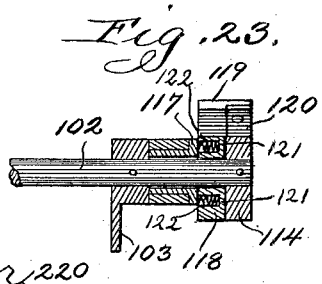
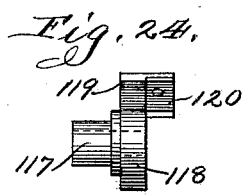
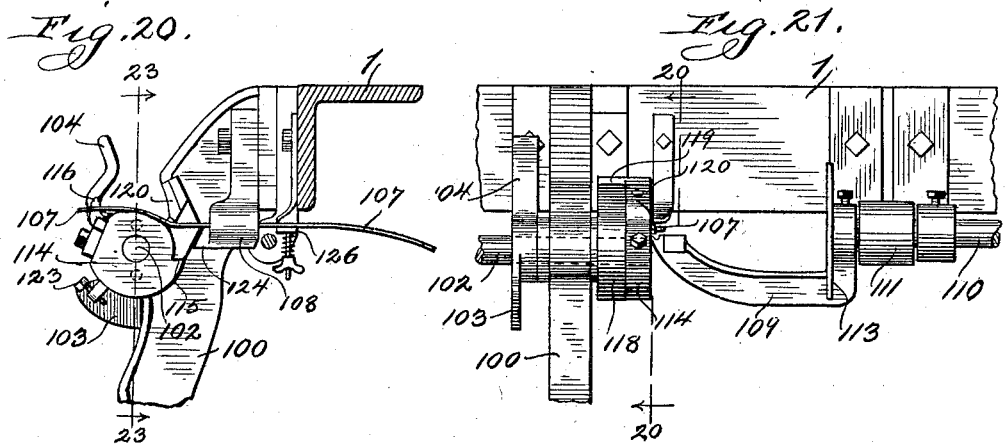
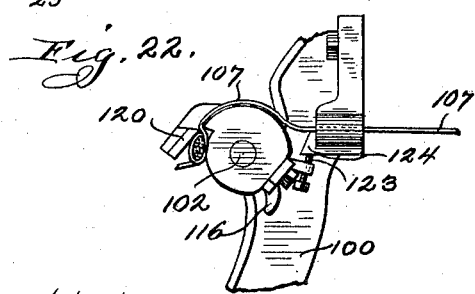
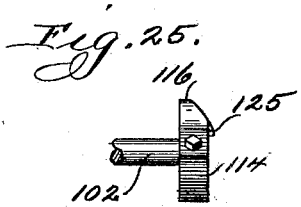

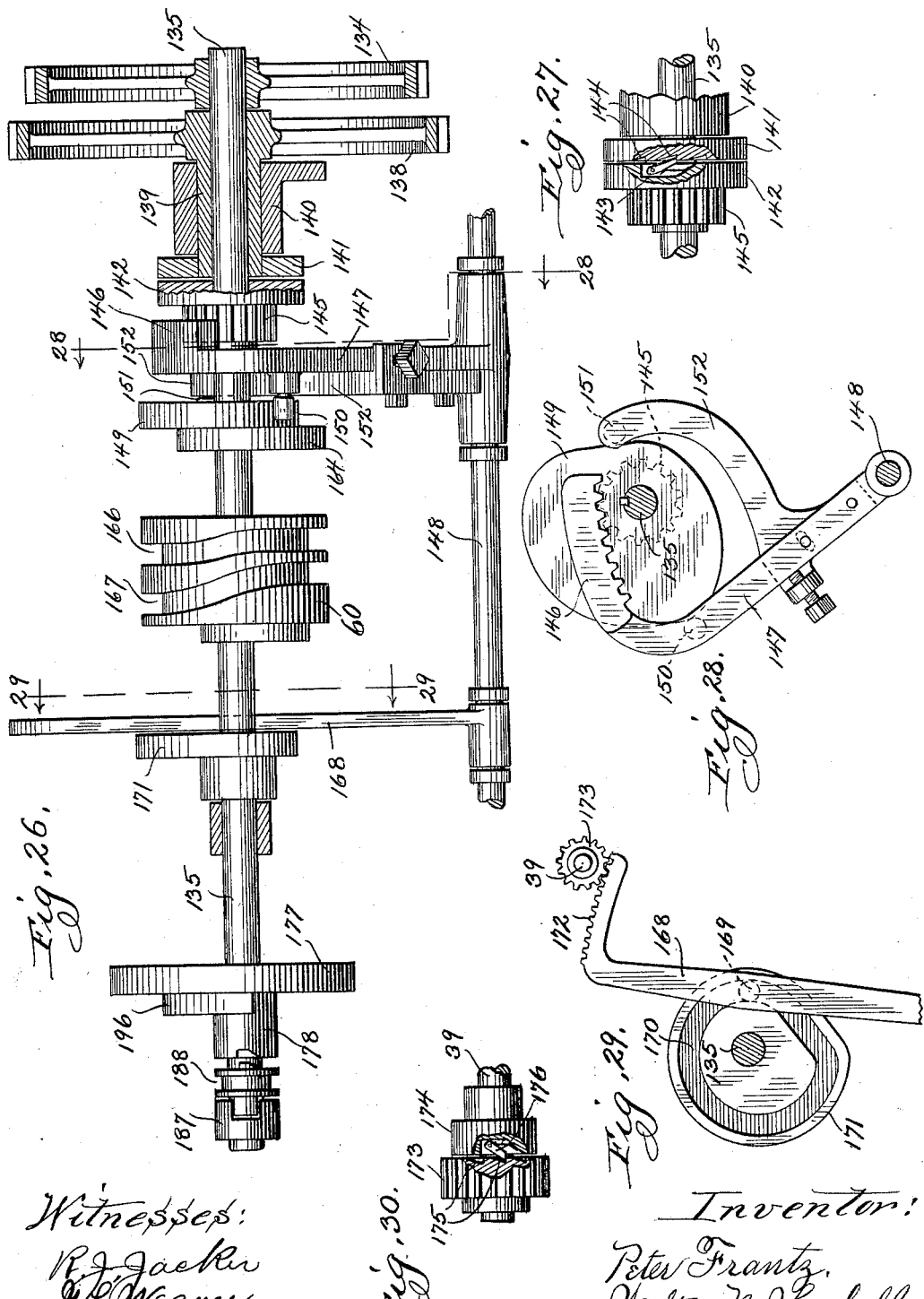

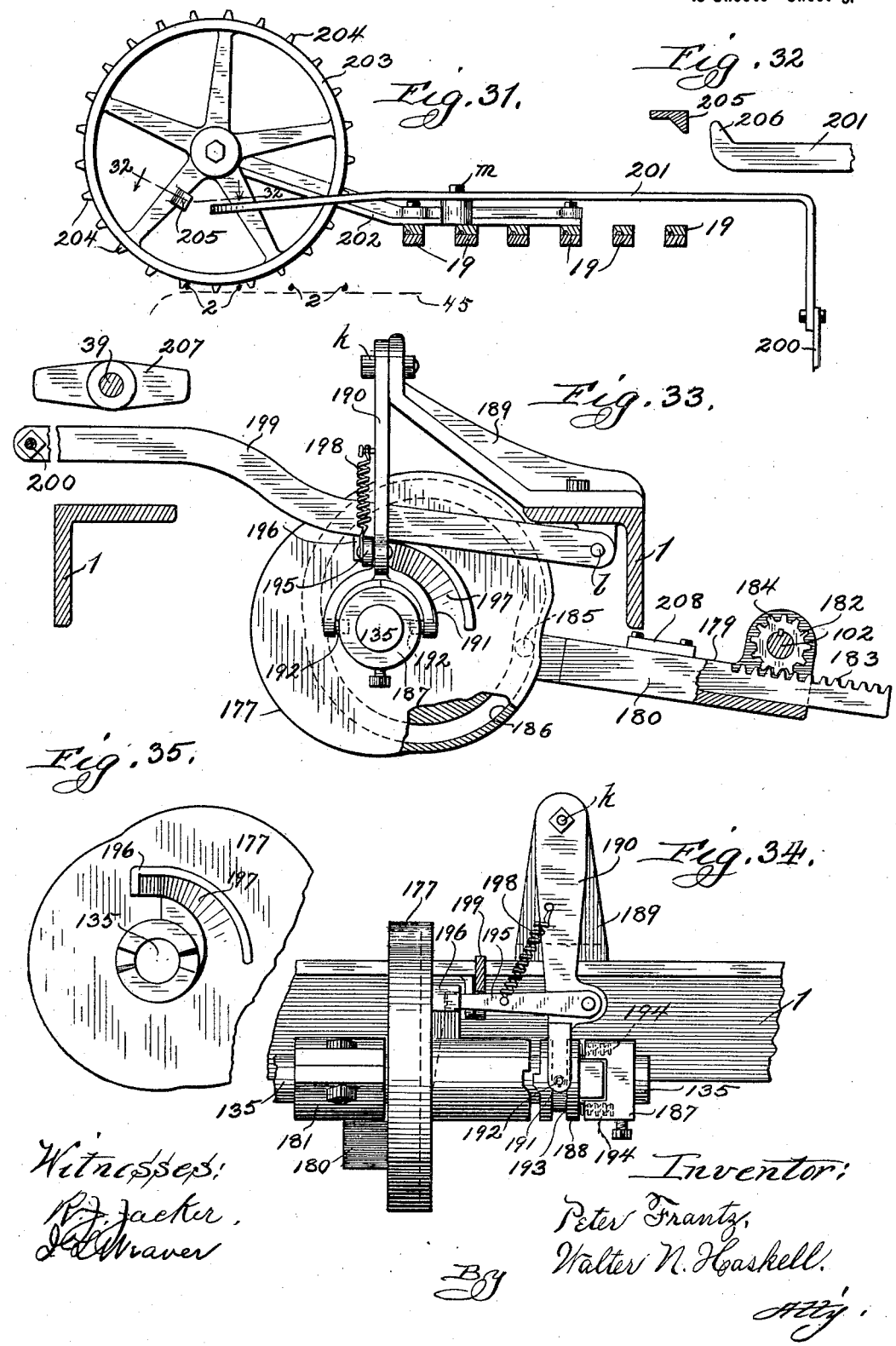

No. 701,478. Patented June 3, 1902.
P. FRANTZ.
BALE TIE MACHINE.
(Application filed Oct. 14, 1901.)
(No Model.) 10 Sheets—Sheet 10.
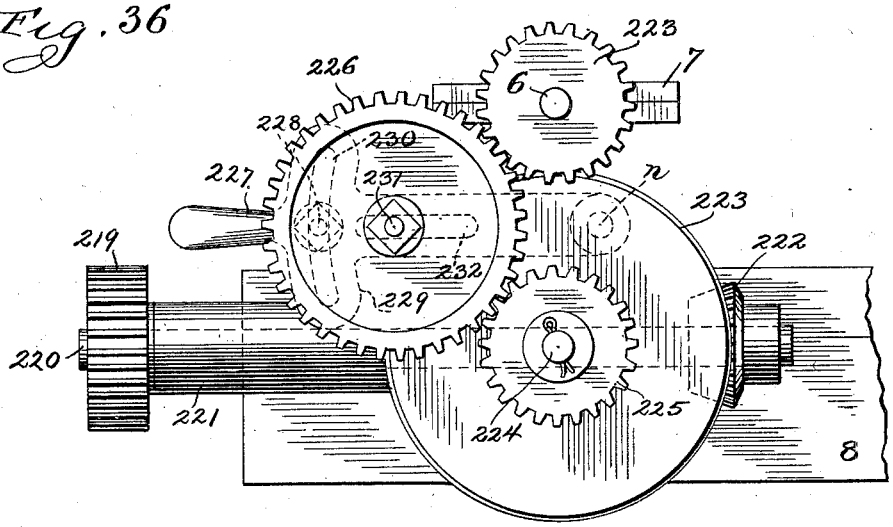
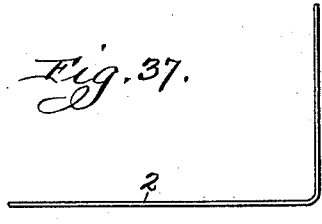
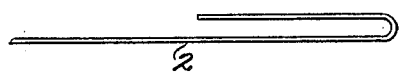
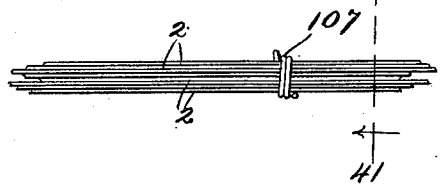
Witnesses:
R J Jacker
J L Weaver
Inventor:
Peter Frantz,
By Walter N. Haskell,
Atty.

UNITED STATES PATENT OFFICE.

PETER FRANTZ, OF STERLING, ILLINOIS.

BALE-TIE MACHINE.

SPECIFICATION forming part of Letters Patent No. 701,478, dated June 3, 1902.

Application filed October 14, 1901. Serial No. 78,584. (No model.)

*To all whom it may concern:*

Be it known that I, PETER FRANTZ, a citizen of the United States, residing at Sterling, in the county of Whiteside and State of Illinois, have invented certain new and useful Improvements in Bale-Tie Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention pertains to machines for making bale-ties, and aims to provide an improved and superior style of mechanism for that purpose.

As heretofore used machines of this class have operated upon one wire at a time, wires being fed into the machine by hand.

My invention is adapted to receive one or more wires as they come from the tempering-furnace or from suitable reels, cut such wires into suitable lengths for bale-ties, form a loop on the end of each wire in succession as they pass through the machine, bind a desired number of the manufactured bale-ties into a bundle, and deliver such bundle from the machine.

Figure 1:
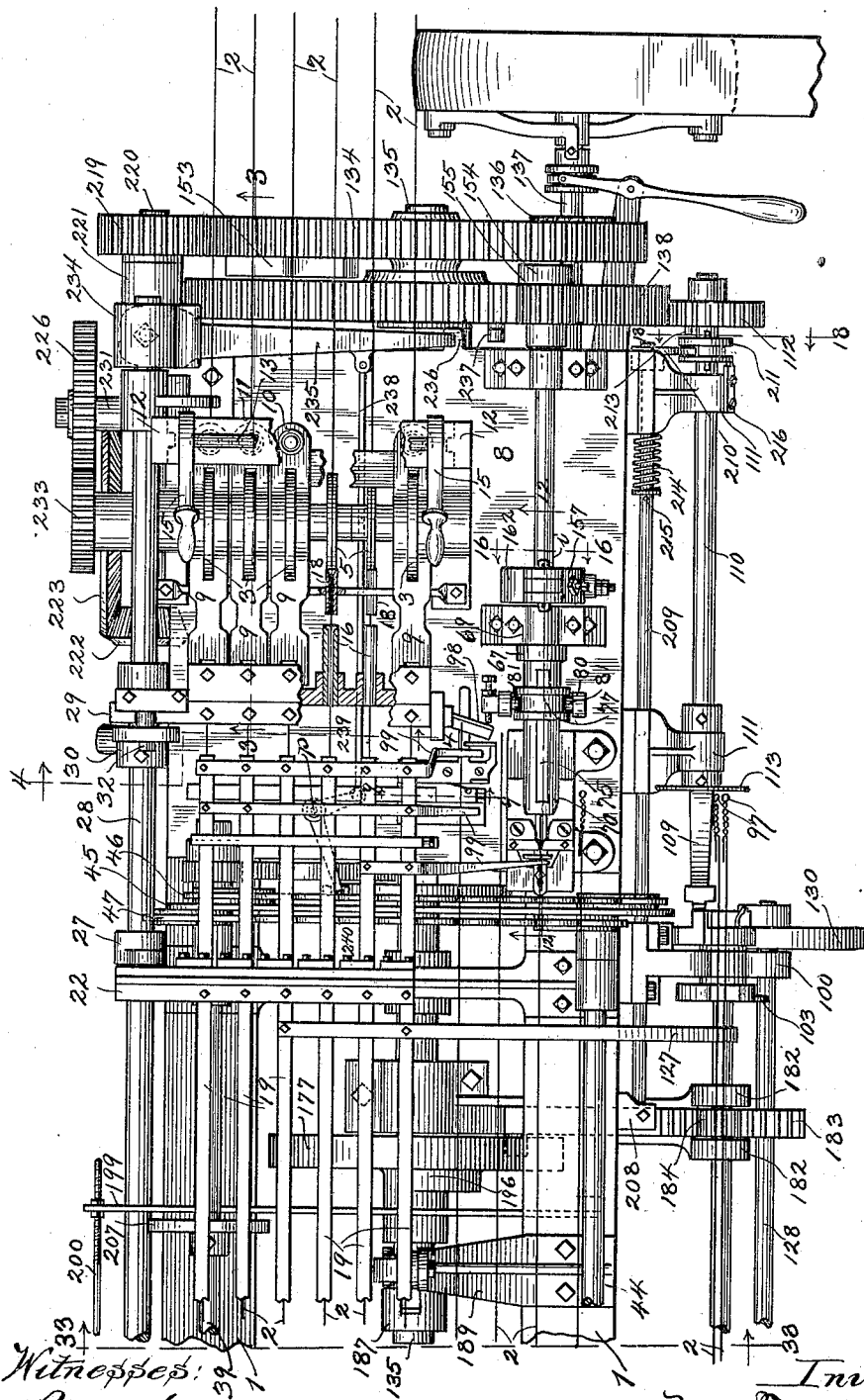
Figure 2:
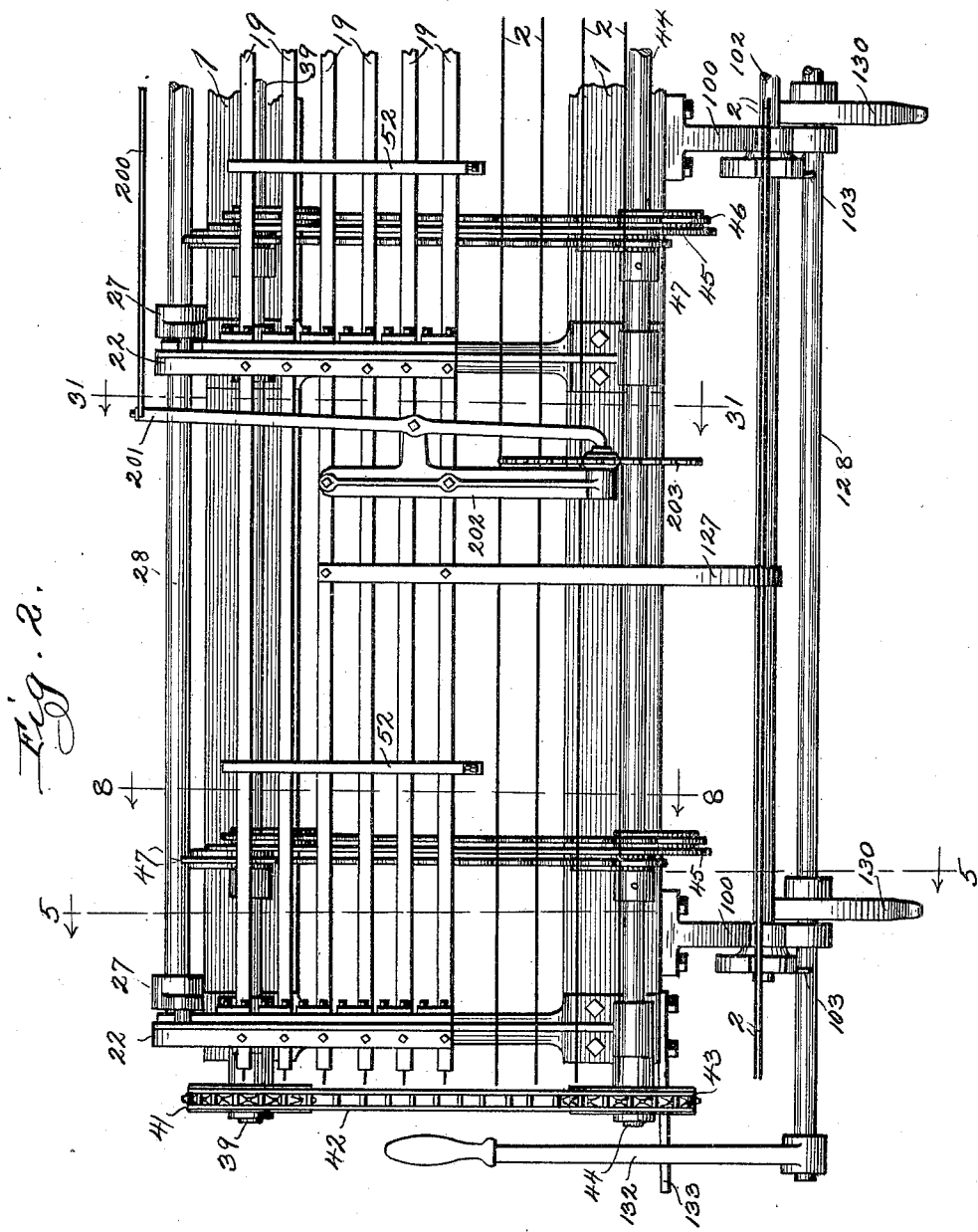
Figure 3:
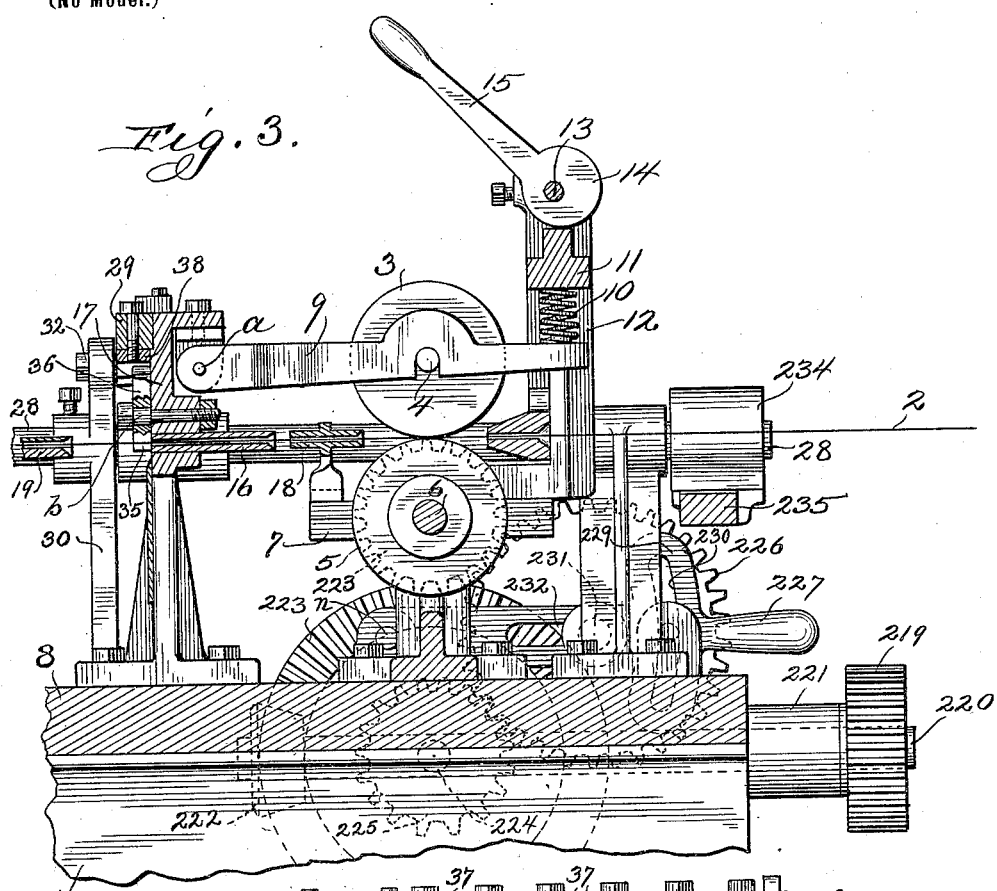
Figure 4:
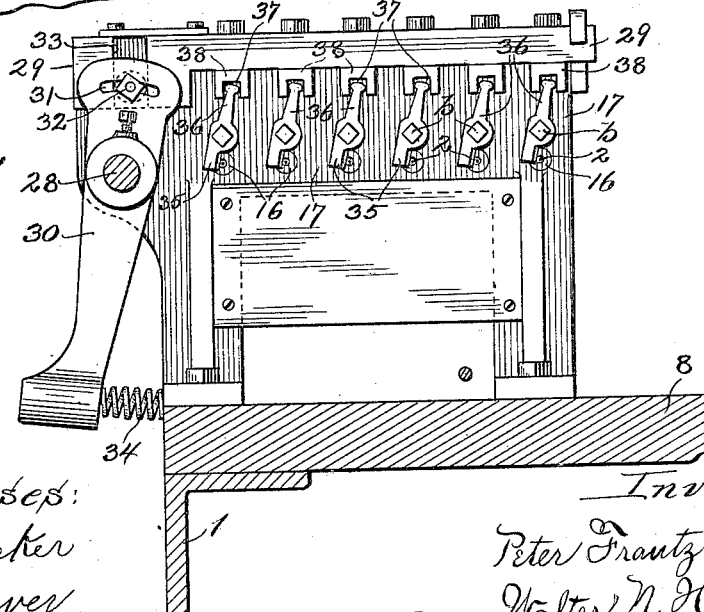
Figure 14:
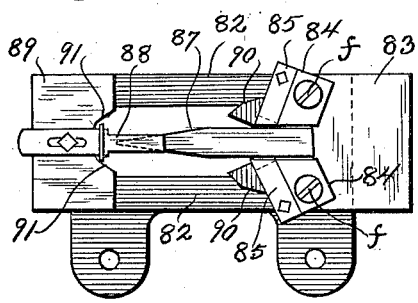
Figure 16:
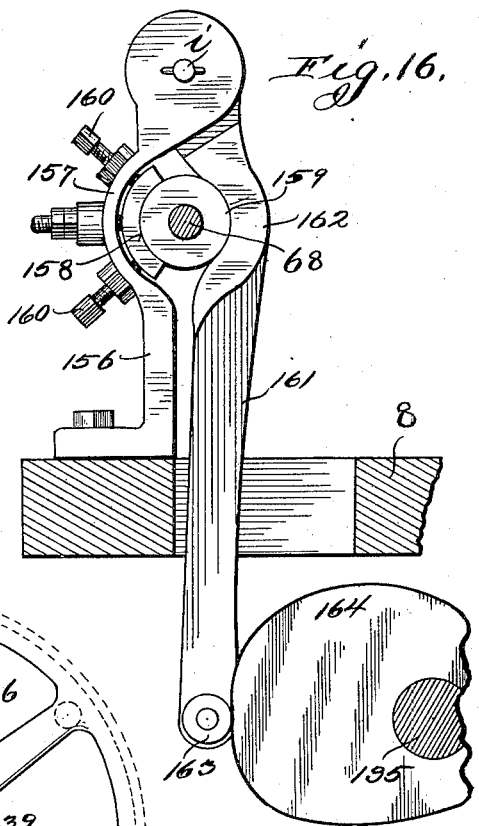
Figure 17:
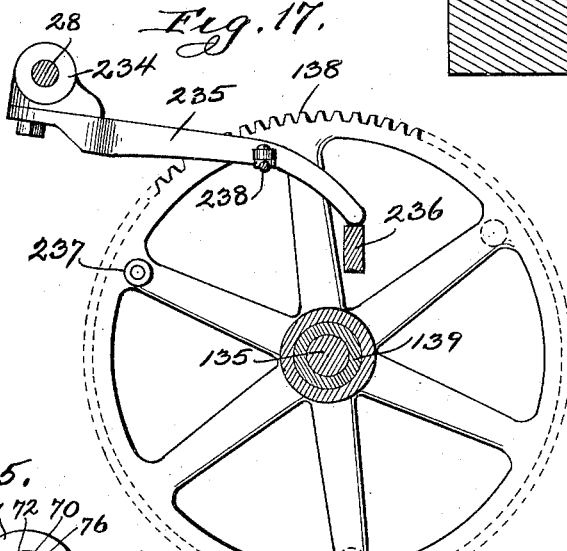
Figure 15:
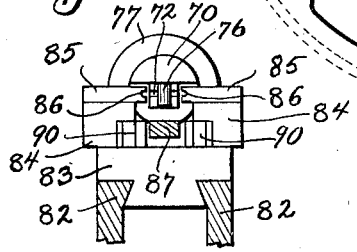
Figure 18:
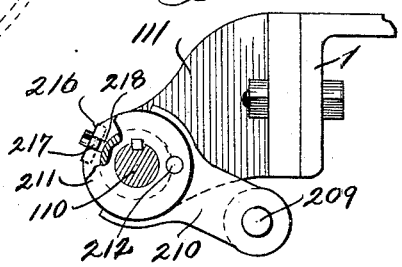

In the drawings, Figure 1 is a plan view of the principal operating part of my machine, one end thereof being cut away. Fig. 2 is a plan view of that part of the machine which is not shown in Fig. 1. Figs. 1 and 2 taken together form a plan view of the entire machine. Fig. 3 is a longitudinal vertical section in the line 3 3 of Fig. 1, showing the feed mechanism. Fig. 4 is a vertical cross-section in the line 4 4 of Fig. 1, showing the wire-cutting mechanism in elevation. Fig. 5 is a vertical cross-section in the broken line 5 5 of Fig. 2, showing mechanism for guiding the wires. Fig. 6 is an enlarged detail view from Fig. 5, showing two of the wire-guides in position for releasing the wires. Fig. 7 is an elevation in detail of one of the plates 102. Fig. 8 is a vertical cross-section in the line 8 8 of Fig. 2, exhibiting the wire-conveying mechanism. Fig. 9 is a vertical cross-section in the line 9 9 of Fig. 1, exhibiting parts of the loop-forming mechanism. Fig. 10 is a vertical longitudinal section of the plunger 55 shown in Fig. 9. Fig. 11 is a vertical cross-section thereof. Fig. 12 is a vertical longitudinal section in the line 12 12 of Fig. 1, showing other parts of the loop-forming mechanism. Fig. 13 is a detail view showing the connection of levers, which appear incomplete in lower part of Fig. 12. Fig. 14 is a plan view of the loop-forming jaws and mechanism appurtenant thereto. Fig. 15 is a front elevation of the same, partly in section. Fig. 16 is a front elevation of the brake mechanism shown in Fig. 12 in side elevation. Fig. 17 is a detailed view of mechanism for actuating the rock-shaft 28. Fig. 18 is an end view of the clutch mechanism for controlling the operation of the coiling-finger 109, a portion of the clutch being broken away. Fig. 19 is a detailed rear elevation of the main gear mechanism and pinions actuated thereby. Fig. 20 is a rear elevation of the bundling device. Fig. 21 is a side elevation thereof. Fig. 22 is a rear elevation of the same in position for cutting the binding-wire and releasing the bundle. Fig. 23 is a vertical longitudinal section of the same in line 23 23 of Fig. 20. Figs. 24 and 25 exhibit in detail the cutting-disks of the bundling device. Fig. 26 is a detached view of the main power-conveying shaft and mechanism appurtenant thereto. Fig. 27 is a detailed view, partly in section, of the disks 141 and 142 in Fig. 26. Fig. 28 is a vertical cross-section in the line 28 28 of Fig. 26, showing the cam 149 and appurtenant mechanism in elevation. Fig. 29 is a vertical cross-section in line 29 29 of Fig. 26, showing the cam 171 and appurtenant mechanism in elevation. Fig. 30 is a detail view of ratchet mechanism for imparting movement to the shaft 39. Fig. 31 is a vertical cross-section in the line 31 31 of Fig. 2, showing the counter-wheel which puts in operation the bundling device. Fig. 32 is a detail section in the line 32 32 of Fig. 31, showing the end of the trip-lever 201 and lug actuating the same. Fig. 33 is a front elevation of the mechanism which operates the bundling device. Fig. 34 is a side elevation thereof looking toward the right-hand side of the machine. Fig. 35 is a detail view showing that face of the cam 177 which is toward the front of the machine. Fig. 36 is a side elevation of the gear-train which imparts movement to the feed-rolls. Figs. 37, 38, and 39 exhibit the loop end of one of the wires, showing the loop in process of formation. Fig. 40 shows a portion of completed bundle of bale-ties. Fig. 41 is a cross-section thereof in the line 41 41 of Fig. 40.

Similar letters and numbers refer to similar parts throughout the several figures.

In considering the drawings that part of the machine which is shown in Fig. 1 at the top of the sheet will be treated as the rear end or back of the machine, that part thereof which is shown in Fig. 2 at the bottom of the sheet as the front end of the machine, and accordingly the right and left sides of such sheets will be respectively the right and left hand sides of the machine. Any description of parts shown by figures other than Figs. 1 and 2 will be made with reference to the general position above set forth.

In the following specification there will be first described those groups of mechanism which act immediately upon the wires, producing some one of the operations of feeding, cutting, conveying, bending, and bundling such wires. Such parts act directly upon the wires and make up what may be designated as the "primary mechanism" of the machine. After such parts are fully described and explained there will be taken up the secondary mechanism, by means of which the primary devices are actuated and controlled.

1 represents the frame of the machine or some portion thereof, and 2 the wires both before and after the formation of the same into bale-ties.

There is shown in Figs. 1 and 3 a train of feed-rolls, consisting of an upper series of rolls 3, seated on the shaft 4, and a lower series of rolls 5, seated on the shaft 6. The shaft 6 is suitably supported in the bearings 7, seated on the bed-plate 8, which is secured to the frame 1. Each upper roll 3 is provided with a tension-bearing 9, hinged, as at $a$, and provided on the upper side of its loose end with an extensile spring 10. Supported by the springs 10 is a cross-bar 11, having vertical play between the uprights 12. There is also secured between the uprights 12 a bar 13, upon which at each end is an eccentric 14, provided with a handle 15, whereby the cross-bar 11 can be forced downwardly upon the springs 10 and the friction between the upper and lower rolls increased or diminished, as desired.

Power is applied to the lower feed-rolls only, as hereinafter set forth, causing such feed-rolls to rotate constantly in a direction which, with the assistance of the upper feed-roll, will propel the wires 2 into the machine. A series of wires 2 (being six in number, as shown in my device) is in this way introduced into the machine, passing, after leaving the feed-rolls, through a series of guide-tubes 16, seated in a face-plate 17, rigidly supported upon the bed-plate 8, Figs. 3 and 4. If necessary, an auxiliary series of guide-tubes 18 may be employed or the tubes 16 may be prolonged a sufficient distance toward the feed-rolls to insure the passage of the wires from such rolls to the tubes. The ends of the guide-tubes farthest from the feed-rolls are flush with the face of the plate 17. From the tubes 16 the wires 2 pass into a series of guides 19, each of which guides is provided with a longitudinal channel 20, Figs. 5 and 6. The guides 19 are formed in two parts. An upper strip 21 is rigidly fastened to two or more supports 22, grooved on their lower faces to form the channels 20. The lower strips 23 are supported by brackets 24, secured to slide-bars 25, which have longitudinal play in ways 26 on the supports 22. The outer end of each slide-bar 25 is pivotally secured to a collar 27, rigidly seated on a rock-shaft 28, journaled in the supports 22. The lower strips 23 of the guides 19 are normally beneath the upper strip 21, closing the channels 20, as shown in Fig. 5; but when it is desired to deliver the wires to other parts of the machine by a slight movement of the rock-shaft 28 outwardly the lower strips 23 are simultaneously drawn aside, opening the guides 19 and permitting the wires to fall therefrom. (See Fig. 6.)

In Fig. 4 is illustrated the cutting mechanism. To the upper part of the face-plate 17 is secured a slide-bar 29, so as to have longitudinal movement thereon. Rigidly secured on the rock-shaft 28, before referred to, is a lever 30, the short end of which has a slot 31, in which is secured a bolt 32. The bolt 32 is provided with an enlarged head which engages the transverse groove 33 in the slide-bar 29. Interposed between the long end of the lever 30 and the frame of the machine is an extensile spring 34. A series of knives 35 equal in number to the guide-tubes 16 is pivotally secured to the face-plate 17 in close proximity thereto, as at $b\ b$. The handles 36 of the knives 35 extend upwardly and are engaged by recesses 37 in a series of blocks 38, secured on the lower side of the slide-bar 29. By a movement of the rock-shaft 28 the short end of the lever 30 is thrown outwardly, carrying the slide-bar 29 and blocks 38 in the same direction and causing the knives 35 to pass over the ends of the tubes 16, severing any wires that may be projecting therefrom. The movement of the rock-shaft 28 is so timed that the wires 2 are cut by the knives 35 after they have extended a desired distance into the machine. The operation of the cutting mechanism is such that the action of the knives 35 in cutting the wires and returning to their former positions is instantaneous, the return of the mechanism to its normal position, as shown in Fig. 4, being aided by the spring 34. The same movement of the rock-shaft 28 which operates the knives 35 opens the guides 19, permiting the severed wires to fall upon the mechanism by which they are conveyed to the loop-forming devices.

Referring to Figs. 5 and 8, 39 is a rotary shaft journaled in bearings 40 in the supports 22, power being applied thereto so as to cause it to rotate intermittently, such shaft being given a half-revolution at a time, such half-revolutions being alternated with short periods of rest. Seated on one end of the shaft 39 is a sprocket-wheel 41, which by means of the sprocket-chain 42 and sprocket-wheel 43 communicates a corresponding intermittent rotation to the shaft 44, upon the end of which the sprocket-wheel 43 is secured. The shaft 44 is suitably journaled on the frame 1, parallel to the shaft 39 and in the same horizontal plane therewith. Supported on the shafts 39 and 44 is a series of tracks 45. Separated by each track 45 is a pair of racks 46 and 47, operated, respectively, by a pair of eccentrics 48 48 and 49 49, seated on the shafts 39 and 44. Each rack is formed of alternating arches 50 and spaces 51, and the eccentrics are so disposed upon the shafts 39 and 44 that those of one rack are in direct opposition to those of the other rack in the same pair, so that in the rotation of the shafts while one rack in each pair is moving downward and backward the other rack of each pair is moving upward and forward. When the shafts are at rest, the racks are all on the same level, and each arch and space forms one of several rows or series of arches and spaces in alinement longitudinally of the machine, so that the wires 2 may occupy a series of spaces 51 lengthwise of the machine, as shown in Figs. 1 and 2. Each guide 19 is just above one of these series of spaces 51, so that when the wires 2 are simultaneously cut and released from such guides they fall upon the tracks 45, each wire occupying one of the series of spaces just beneath the guide 19 from which it was released. To prevent any danger of the wires jumping and entering the wrong spaces, there are secured to the guides 19 bars 52, each provided with a series of downwardly-extending fingers 53, which insure the delivery of the wires to their proper spaces. After falling upon the tracks 45 the wires 2 are given an intermittent lateral movement toward the right-hand side of the machine by means of the racks 46 and 47 until they pass over the ends of such tracks at one side of the machine. Before reaching this point, however, each wire in succession has a loop formed in one end thereof, as hereinafter set forth. In their lateral movement the wires do not rise from the tracks, but merely slide thereon. As illustrated in Fig. 8, the next movement of the shafts 39 and 44 would carry the rack 46 downward and backward, so that its arches 50 would pass below the wires on the track 45. At the same time the rack 47 would move forward and upward; but by reason of the depth of the spaces 51 the wires 2 would accommodate themselves thereto and would be merely forced along on the tracks 45 by the movement of the arches on the racks 47 toward the right-hand side of the machine. At the end of a half-rotation of the shafts 39 and 44 the racks 46 and 47 will have changed positions and each wire 2 moved one space farther toward the side of the machine. The next movement of the shafts 39 and 44 would bring the rack 46 back to its former position, moving the wires 2 another space toward the right-hand side of the machine.

The timing of the mechanism is such that while the series of wires 2 is attaining the desired length in the guides 19 the shafts 39 and 44 are given three revolutions. During these three revolutions there will be six movements of the wires on the tracks 45, so that when the last series of spaces 51 beneath the guides 19 is cleared of such wires, as shown in Fig. 8, another series of such wires is cut and delivered upon the tracks and follows immediately after the others, rendering the passage of such wires through the machine continuous.

The loop-forming mechanism will next be described. Supported upon the bed-plate 8 is an elevated track 54, upon which a plunger 55 has reciprocating movement transversely of the machine, Fig. 9. The plunger 55 is actuated by a lever 56, fulcrumed in the bed-plate 8, as at $c$, the long end of the lever 56 engaging lugs 57 in the lower side of the plunger. The short end of the lever 56 is provided with a follower 58, engaging a track 59 on the face of the cam 60. This cam is seated on the main shaft of the machine, as will be hereinafter more fully set forth. The plunger 55 is provided at one end with a perforation 61, in which is situated a vertical pin 62, such pin being held in place by a small coiled spring 63, seated in a recess 64 in the plunger 55 and pressing against one side of the pin 62. Just beneath the pin 62 is an incline 65, formed on the track 54. The plunger 55 is provided with a rearwardly-extending bar 66, which supports the severed ends of the wires 2 as they move along the tracks 45.

67 is a twisting-head seated on one end of a rotary shaft 68, journaled in bearings 69 in the bed-plate 8. The twisting-head has a projection 70, to which is secured a plate 71, having a groove 72 in one end thereof. In the back of the twisting-head 67 is a depression 73, ending in an aperture 74 in the projection 70. Fulcrumed in the head 67, as at $d$, so as to occupy the depression 73 therein, is a lever 75, having a pin 76 on the long end thereof, which projects downwardly through the aperture 74. The short end of the lever 75 is inclined slightly upward.

Loosely supported on the twisting-head 67 is a collar 77, having an annular groove 78. The collar 77 has restricted movement longitudinally of the twisting-head, being actuated by a lever 79, fulcrumed, as at $e$, on the bed-plate 8, and having at its upper end a yoke 80, provided with rollers 81, which engage the groove 78. The other end of the lever 79 is operated by a cam, as will be hereinafter explained. As the collar 77 is moved backward on the twisting-head 67 the short end of the lever 75 is depressed, the long end thereof being thereby raised and the pin 76 drawn up into the projection 70. This is the normal position of the twisting-head mechanism when such twisting-head is at rest.

Beneath the twisting-head 67 and a little in advance thereof are two elevated tracks 82, secured on the bed-plate 8. A slide-block 83 has longitudinal play upon the tracks 82, and pivotally secured upon the upper face of the slide-block 83, as at $f$, are two jaws 84 84. (See Fig. 14.) The jaws 84 are provided with cross-plates 85, the inner ends of which have horizontal grooves 86, Fig. 15, such grooves being in the same horizontal plane as the groove 72 in the plate 71 of the twisting-head. Between the jaws 84 is a dividing-strip 87, having a raised portion 88, which is rigidly secured to a fixed plate 89 on the forward ends of the tracks 82. The main strip 87 is brought to a point just beneath the raised portion 88, as shown in dotted lines in Fig. 14.

The jaws 84 are provided at their bases with wedge-shaped guides 90, which upon the forward movement of the slide-block 83 pass beneath the raised portion 88 and come in contact with each other by reason of the inclined walls 91 of the plate 89 engaging the outer faces of such guides 90. The same operation brings the grooved ends of the plates 85 in contact with each other. A contrary movement of the slide-block 83 again separates the jaws 84 and cross-plate 85.

Reciprocating movement upon the tracks 82 is imparted to the slide-blocks 83 at desired intervals by means of a lever 92, fulcrumed to the lower face of the bed-plate 8, as at $g$, the upper end of such lever engaging projections 93 on the lower face of the slide-block 83. By means of a connecting-bar 94 the lever 92 is loosely united with the parallel lever 95, also fulcrumed to the lower face of the bed-plate 8, as at $h$, and provided with the follower 96, whereby the lever 95 is operated from a cam on the main shaft, as will be shown hereinafter. The provision of the parallel levers 92 and 95 is a matter of convenience and permits of the use of one cam to operate the levers 79 and 92, whereas otherwise two cams would be necessary.

The operation of the loop-forming mechanism hereinabove described is as follows: Supposing one of the wires 2 to be in line with the twisting-head 67, as shown in Fig. 1, the next succeeding wire 2 is between such twisting-head and the plunger 55. As this next wire is advanced by the conveying mechanism toward the twisting-head the plunger moves in the same direction, bringing the pin 62 immediately in the rear of such wire. At this time the slide-block 83 is at the end of its rearward movement, the jaws 84 being slightly in rear of the pin 76 in the twisting-head. As the wire continues to advance it is caught between the pin 62 and the nearest jaw 84 and the end thereof bent at right angles, as shown in Fig. 37. At this point in the operation the long end of the lever 75 of the twisting-head 67 is raised and the pin 76 withdrawn into the projection 70. When the plunger 55 reaches the end of its stroke, the pin 62 is just under the pin 76, such pins being horizontally in line and nearly touching, the bent end of the wire being held by the pin 62 in the groove 72 of the plate 71. The long end of the lever 75 is then thrown downward, the pin 76 displacing the pin 62 and forcing it downward into the plunger 55. The wire is now held in the groove 72 by the twisting-head pin 76. As soon as the pin 62 is displaced the plunger 55 returns to its former position, the pin 62 being raised to its former position by the incline 65, such pin passing, however, beneath the next succeeding wire 2 before being raised. As soon as the plunger 55 is clear of the twisting-head the jaws 84 are moved forward, the grooves 86 engaging, respectively, the main wire 2 and the bent end thereof, bending such end still farther around the pin 76 until it forms a hook, as shown in Fig. 38. As the jaws close they bring the wire and the bent end thereof together a few inches in advance of the twisting-head and hold them firmly in the same horizontal plane while the twisting-head describes the desired number of revolutions, forming a loop 97 on the end of the wire. The number of revolutions as practiced in my machine is four. After forming the loop the twisting-head 67 stops in its normal position, as shown in Fig. 12, the lever 75 is raised, and the jaws 84 moved backward, liberating the completed loop. While the twisting operation is in progress, the conveying mechanism is at rest. In order that the loops 97 may be uniform in length, I provide a guide 98, Figs. 1 and 9, which serves as a gage for the loop ends of the wires 2 and fixes the length thereof. One or more guards 99 may be employed attached to the guides 19 to prevent the loop ends of the wires jumping or becoming displaced. The end of that guard 99 which is nearest the cut end of the wires is inclined slightly downward, so that when the end of the wire passes beyond the end of such guard it cannot return thereunder. As the end of the wire is bent at right angles, as hereinbefore described, the bent end of the wire is raised slightly upward by the end of said guard 99, preventing such end of the wire coming in contact or interfering with the next succeeding wire 2. After leaving the twisting mechanism the wires are carried over the ends of the tracks 45, as hereinbefore stated, and delivered to the bundling device, which consists, primarily, of the following-described mechanism: Secured to the frame 1 at the right-hand side of the machine is a series of brackets 100, in which is journaled in bearings 101 a rock-shaft 102, Figs. 1, 2, and 5. Fixed on the shaft 102 is a series of segment-plates 103, each of such plates being provided on the upper edge thereof with a horn 104, between which and the edges 105 of the plates 103 the wires 2 fall when carried over the ends of the tracks 45. When a desired number of completed bale-ties has been received between the horns 104 and the edges 105, the shaft 102 is rocked inwardly, carrying with it the horns 104, which force such bale-ties into a compact and circular bundle in recesses 106 in the brackets 100. The wires are then firmly held in this position while a binding-wire 107, fed through a guide 108, Fig. 20, is twisted a desired number of times about the bundle of wires near the loops 97 thereon. This is accomplished by means of a coiling-finger 109, fixed on the end of a rotating shaft 110, such shaft being journaled in bearings 111 on the frame 1 and actuated by a gear-pinion 112 on that end of such shaft opposite to the coiling-finger.

My machine is so constructed and operated as to cause two revolutions of the shaft 110 for each bundle, resulting in two coils of the wire 107, as shown in Fig. 40. The coiling-wire may be fed from an ordinary reel conveniently secured to some part of the frame 1. After being coiled about the bundle the wire 107 is cut close to such bundle by the following means: On that end of the shaft 102 adjacent to the coiling-finger 109 is fixed a disk 114, Figs. 20 to 25, provided on its periphery with a knife 115 and prong 116. Secured to the shaft 102, so as to move therewith in the bearing 101, is a bushing 117. Between the disk 114 and bushing 117 is a disk 118, loosely seated on the shaft 102 and provided on its periphery with a head 119, in which is secured a knife 120. That face of the disk 118 nearest the bushing 117 has recesses 121 to hold friction-springs 122. Opposite to the head 119 on the periphery of the disk 118 is a stop-bolt 123, and projecting from the guide 108 in the rear of the disk 118 is a stop 124, against which the head 119 strikes, as shown in Fig. 20, preventing further backward movement of the disk 118.

The mechanism for cutting the coiling-wire 107 is normally in the position shown in Fig. 20, the bale-ties being received therein above the projecting end of the coiling-wire 107. When the desired number of wires 2 have been received in the bundling mechanism and the shaft 102 rocks inwardly, as hereinbefore mentioned, it carries with it the disk 114, the prong 116 keeping in line with the horns 104 and assisting in forcing the wires into a bundle. The projecting end of the wire 107 is then wrapped about the bundle, as above stated. During this movement the disk 118 has been stationary against the stop 124. As soon as the coiling operation is completed the shaft 102 moves outward again, going beyond its former position and performing something more than a half-rotation. In the consequent outward movement of the disk 114 the knife 115 comes in contact with the wire 107, such wire being embraced between the knives 115 and 120. The knife 115 would ordinarily pass beneath the knife 120; but on account of the presence of the wire 107 between such knives as the disk 114 continues to revolve it carries with it the disk 118, at the same time drawing out a new piece of the wire 107 to be used in binding the next succeeding bundle of bale-ties. When the disks have performed about a half-revolution together, the disk 118 ceases to revolve by reason of the bolt 123 coming in contact with the stop 124, as shown in Fig. 22. The disk 114 continues to revolve, however, until the knife 115 passes the knife 120, cutting the wire 107 and releasing the bundle of wires. By the same outward movement of the shaft 102 the horns 104 are turned outward and downward, permitting the bundle to fall therefrom. The edges 105 of the plates 103 aid in ejecting the wires from the bundling mechanism. After the bundle has been released the shaft 102 and appurtenant apparatus return to their normal position and the process is repeated. As the bushing 117 and disk 114 return to their former positions there is sufficient friction upon the disk 118, caused by the springs 122, to compel the same to revolve with the other parts until the head 119 again comes in contact with the stop 124. The disk 114 is provided on its outer face with a lug 125, having a beveled face adapted to force the end of the wire 107 away from such disk as the latter is turned backwardly. The engagement of the end of the wire by the coiling-finger is thus assured. The tension of the wire 107 is regulated by a spring-actuated clamp 126, secured to the frame 1. Guards 127, secured to the guides 19, may be used to insure the passage of the wires from the loop-forming to the bundling mechanism. The bundles of bale-ties may be discharged from the bundling mechanism upon the floor or upon a suitable vehicle to convey the same from the machine, or, if desired, a shaft 128 may be secured in bearings 129 in the brackets 100, Fig. 5. Fixed upon such shaft 128 is a series of supports 130, having backwardly-extending bell-crank-shaped arms 131. By means of a lever 132, secured to the end of the shaft, Fig. 2, and resting upon the support 133, the shaft 128 can be rocked outwardly when desired. In this construction a bundle of bale-ties is discharged from the bundling mechanism upon the supports 130, and when a desired number of bundles have been delivered thereto they can be simultaneously dumped by operating the lever 132, the arms 131 aiding in discharging the bundles from the supports.

The secondary mechanism, by means of which the primary mechanism is actuated and operated, will next be taken up and described in detail.

Referring to Figs. 1 and 26, 134 is the main gear-wheel, fixed on the main shaft 135, suitably supported in the frame of the machine longitudinally thereof. Motion is imparted to the drive-wheel 134 by means of a pinion-gear 136, fixed on a rotating shaft 137. There is indicated in the drawings a clutch mechanism for quickly starting or stopping the machine; but the use thereof is optional, is not involved in the operation of the machine, and need not be particularly described. A large gear-wheel 138 is fixed on a hollow shaft 139 just in rear of the wheel 134, Figs. 17 and 26. The shaft 139 is journaled in the bearing 140, secured in the frame of the machine, such hollow shaft having rotation upon the shaft 135. On the inner end of the hollow shaft 139 is secured a disk 141, and contiguous thereto, but seated loosely on the main shaft 135, is a similar disk 142. The inner face of the disk 142 is provided with one or more spring-pawls 143, adapted to engage a circular series of ratchets 134 in the face of the disk 141, Fig. 27. Integral with the disk 142 and adapted to rotate therewith on the shaft 135 is a pinion-gear 145, actuated by a rack 146 on the bent-arm lever 147, fulcrumed on a supporting-shaft 148, secured in the frame of the machine. Fixed on the shaft 135 is a cam 149, the periphery of which engages the follower 150 on the lever 147. Each revolution of the shaft 135 and cam 149 throws the lever 147 outward, causing the pinion 145 and disk 142 to rotate and imparting to the hollow shaft 139 and wheel 138 a one-third revolution. As the cam 149 continues to revolve it engages the follower 151 on the arm 152, adjustably secured to the lever 147, such lever and the rack 146 being thereby drawn inward ready for the next outward throw. The stopping of the wheel 138 when it has described one-third of a revolution is rendered positive by means of a segment-cam 153, secured to the inner face of the wheel 134 and engaging the cam 154, fixed on the end of the twisting-head shaft 68, Fig. 1 and Fig. 19. Just in rear of the cam 154 on the shaft 68 is secured a pinion gear-wheel 155, actuated by the gear-wheel 138, a one-third revolution of the wheel 138 causing the pinion 155 to rotate four times, giving to the twisting-head the four revolutions already mentioned. As the wheel 138 nears the end of its one-third revolution the cam 153 engages the straight edge of the cam 154, stopping the shaft 68 and pinion 155 and through them the wheel 138. By the same arrangement the twisting-head 67 is stopped in the same position at the end of each operation thereof. If desired, a brake attachment may also be employed, as shown in Fig. 16. An upright 156, fixed to the bed-plate 8, has a curved portion 157, in which is pivotally secured a segment-bearing 158, adapted to engage the collar 159, secured to the shaft 68. The bearing 158 is capable of adjustment with relation to the collar 159 by means of set-screws 160 in the curved portion of the upright. Hinged in the upright 156, as at $i$, is a downwardly-extending lever 161, having a curved portion 162, the inner face of which engages the collar 159. On the lower end of the lever 161 is a follower 163, actuated by a cam 164 on the main shaft 135, the operation of such cam being so timed that it causes a gradually-increasing pressure to be exerted upon the collar 159 by the lever 161 when the wheel 138 is nearing the end of a one-third revolution, thus assisting in bringing the shaft 68 to rest at the proper time.

Referring again to Fig. 26, 60 is a cam secured on the main shaft 135 and provided with tracks 166 and 167, the track 166 engaging a follower (not shown) on the lower end of the lever 79, Fig. 12, and the track 167 engaging the follower 96 on the lever 95. Fulcrumed on the supporting-shaft 148 is the lever 168, having a follower 169, engaged by a track 170 in the face of a cam 171, fixed on the main shaft 135. The upper end of the lever 168 is bent outwardly into the rack 172, engaging and actuating the pinion 173, seated on the shaft 39, so as to rotate freely thereon. Fixed on the shaft 39, adjacent to the pinion 173, is a disk 174, Fig. 30. The inner face of the pinion 173 has an annular series of ratchets 175, engaging one or more pawls 176 in the inner face of the disk 174. The construction of the last-named parts is such that each revolution of the main shaft 135 and cam 172 imparts to the disk 174 and shaft 39 a half-revolution, moving the wires 2 one space upon the tracks 45, as hereinbefore described.

The bundling mechanism is actuated and controlled as follows, reference being had to Figs. 31 to 35: The cam 177 is fixed on the end of a hollow shaft 178, adapted to rotate upon the main shaft 135. A slide-bar 179 has longitudinal play in ways 180, secured at one end in a bearing 181 on the main shaft 135 and at the other end in bearings 182 on the shaft 102, Fig. 1. At its outer end the slide-bar 179 is provided with a rack 183, engaging a gear-pinion 184, fixed on the shaft 102. On the inner end of the slide-bar 179 is a follower 185, engaging a cam-track 186 in the face of the cam 177. Fixed on the shaft 135 is a collar 187 in constant engagement with the clutch 188. Secured to the frame 1 is a bracket 189, from which is pivotally suspended a hanger 190, provided at its lower end with a yoke 191, the rollers 192 of which engage a circumferential groove 193 on the clutch 188. The collar 187 is recessed to hold extensile coiled springs 194, which impinge the face of the clutch 188 and tend to throw such clutch into engagement with the hollow shaft 178. This tendency is overcome, however, by means of a brace 195, pivotally secured to the hanger 190, as at $k$, the free end of the brace 195 resting against a cam 196 on the face of the cam 177 and holding the clutch 188 out of engagement with the shaft 178, as shown in Fig. 34. This is the normal position of such mechanism. When it is desired to operate the cam 177, the brace 195 is forced downward until the end thereof slips off of the cam 196, striking the face of the cam 177 and permitting the clutch 188 to engage the shaft 178, the rotary movement of such clutch being thus imparted to said shaft and the cam 177 seated thereon. As this cam revolves the formation of the cam-track 186 is such that the rack 183 is moved outwardly a short distance, rocking the shaft 102 inwardly, as already described. The rack is stationary a moment while the bundle is being bound, after which it moves inwardly again, rotating the shaft 102 outwardly, as before shown, after which such rack again moves outwardly, returning the shaft to its original position. This is done in one revolution of the cam 177. The cam 196 is provided with a track 197 of partial spiral form and inclining gradually outward from the face of the cam 177, so that as the latter cam continues to revolve the brace 195, the end of which follows the track 197, is forced gradually away therefrom until when the cam 177 has completed its revolution the brace 195 has been returned to its normal position, as shown in Fig. 34, and the clutch 188 and hollow shaft 178 are disengaged. The movements of the cam 177 and mechanism operated thereby thereupon cease. The brace 195 is secured against dropping of its own weight by means of a spring 198. Just above the brace 195 is a lever 199, fulcrumed in the frame 1, as at *l*, Fig. 33, the free end of such lever being connected by means of a rod 200 with a lever 201, fulcrumed to a support 202, as at *m*. (See Figs. 1, 2, and 31.) The support 202 is secured on the guides 19 and carries at its outer end a counter-wheel 203, having on its periphery a plurality of equidistant teeth 204, equaling in number the number of wires it is desired to bind together in a bundle, the preferred number thereof, as shown in my device, being 25. On one of the spokes of the wheel 203 is the lug 205, adapted to engage at each revolution of such wheel a projection 206 on the end of the lever 201, the engaging faces of such lug and projection being beveled, so as to facilitate their operation. On the shaft 39, slightly out of line with the lever 199, is secured a cam 207, having intermittent rotation with such shaft. When the lug 205 comes into contact with the projection 206, the end of the lever 201 is thrown outward from the wheel 203, drawing the lever 199 into line with the cam 207, which at its next movement forces the lever 199 downward, displacing the brace 195 and operating the cam 177 and mechanism dependent thereon. The wheel 203 is so situated that as the wires move toward the end of the tracks 45 each wire in succession comes in contact with one of the teeth 204, moving said wheel such part of a revolution as there are teeth upon its periphery. It is apparent that for each revolution of the wheel and consequent movement of the lever 201 twenty-five wires must have passed the wheel and been delivered to the bundling mechanism. On the slide-bar 179 is a cam-plate 208, Fig. 1, engaging the beveled end of the rod 209, supported by the bearings 111. To the other end of the rod 209 is secured a yoke 210, engaging a clutch 211, feathered on the shaft 110, so as to have movement longitudinally thereof. The pinion 112 is in mesh with the gear-wheel 138 and rotates freely upon the shaft 110. As the rack 183 moves outward it forces the rod 209 and clutch 211 toward the pinion-gear 112, which at this period is at rest. The recess 212 in the clutch 211 is thereby engaged by a pin 213 on the pinion 112, whereupon such pinion and the shaft 110 are given two revolutions by one of the movements of the gear-wheel 138. As the rack 183 is moved backward the rod 209 is released, returning to its former position, being aided therein by a coiled spring 214, secured on the rod 209 between a pin 215 therein and the bearing 111. The pinion 112 is at times actuated by the gear-wheel 138 when it is not desired to have the coiling device operated, and to prevent the disturbance thereof at such times there is provided on the bearing 111 nearest the clutch 211 a plate 216, provided with a point 217, adapted to engage a recess 218 in the clutch 211 when such clutch is out of engagement with the pinion 112, Figs. 1 and 18.

The feed and cutting mechanism are operated as follows: Engaged by the drive-wheel 134 is a pinion gear-wheel 219, fixed on a rotating shaft 220, journaled in a bearing 221, which is secured on the frame 1, Figs. 1, 3, and 36. On the end of the shaft 220 opposite to the pinion 219 is a bevel gear-pinion 222, engaging a bevel gear-wheel 223, fixed on a short shaft 224, supported in the frame 1. Secured on the shaft 224 outside of the gear-wheel 223 is a gear-wheel 225, engaging an idler gear-wheel 226, adjustably secured to the frame 1 by any known method, so as to be capable of vertical or horizontal adjustment thereon. The arrangement shown consists of a hand-lever 227, fulcrumed in the frame, as at *n*, and adapted to be rigidly secured to such frame by means of a lock-bolt 228, engaging the rack 229, having a slot 230 therein. The gear-wheel 226 is fixed on a short shaft 231, rigidly secured to the lever 227 and capable of adjustment therein by means of the longitudinal slot 232. The idler-gear 226 engages in turn the gear-wheel 233, fixed on the lower shaft 6 of the feed-rolls. There is thus communicated from the main wheel 134 to the feed-rolls 5 a constant rotation adapted to feed the wires 2 continuously into the machine. On the rear end of the rock-shaft 28 is fixed a head 234, Figs. 1 and 17, to which is pivotally secured, as at *o*, a lever 235, so as to have limited horizontal movement upon its pivotal point, the free end of the lever resting upon the bed-plate 8 or a projection 236 thereof. On the inner face of the wheel 138 is a friction-roller 237, adapted to engage and raise the lever 235, resulting in the rocking of the shaft 28, before referred to. The lever 235 is only engaged by the roller 237, however, at each alternate revolution of the wheel 138, such lever being out of engagement with said roller during the intervening alternate revolutions of such wheel.

This result is accomplished by the following means: One end of the rod 238 is secured to the lever 235, the other end of such rod being pivotally attached to a bell-crank lever 239, fulcrumed on the bed-plate 8, as at p. The long end of the lever 239 is engaged by lugs 240 on the rack 46 nearest to such lever, the alternate reciprocations of such rack through the medium of the lever 239 causing the rod 238 to oscillate, alternately drawing the lever 235 out of proximity to the wheel 138 and returning the same thereto.

It will be remembered that the wheel 138 performs one-third of a revolution to one revolution of the wheel 134 and shaft 135 and that at each revolution of the wheel 134 the rack 146 will perform one movement by reason of a half-rotation of the shafts 39 and 44.

Supposing the roller 227 to be at the highest point in its movement on the wheel 138 and the lever 235 to be in engagement therewith, before such roller again returns to said point there will be three movements thereof, one for each revolution of the shaft 135; but during the same time there will be three movements of the rod 238 and lever 235, so that when the roller next arrives at the top of the wheel such lever will not be engaged thereby. During another revolution of the wheel 138 there are three additional oscillations of the lever 235, bringing such lever again in contact with the roller 237 when it arrives at the top of the wheel. It will be seen, therefore, that there is contact between the roller 237 and lever 235 at the end of each sixth movement of such lever, resulting in the rocking of the shaft 28, the movement whereof simultaneously severs the series of wires 2 and opens the guides 19, releasing the wires therefrom. Immediately after a series of wires is severed and released from said guides the following operations are simultaneously performed in the same period of time. The wheel 134 and shaft 135 revolve six times, the racks 46 and 47 have six movements, by which the severed wires are conveyed six spaces toward the loop-forming mechanism, a new series of wires 2 is fed the desired distance into the machine, the wheel 138 revolves twice—three movements to each revolution—the loop-forming mechanism operates six times, and six bale-ties pass the counter-wheel and are delivered to the bundling mechanism. The period closes with another movement of the rock-shaft 28, and the operation continues as before.

In recapitulation, a series of wires is fed in at the rear of the machine by means of feed-roll mechanism, the wires passing into longitudinal guides, wherein they are supported until they have attained a desired length, whereupon they are simultaneously cut and released, falling upon mechanism which moves them intermittently and successively toward that side of the machine wherein are located the loop-forming and bundling devices. Each wire in its lateral passage through the machine has a loop formed on one end thereof by means of the twisting-head and attendant mechanism. The wires then continue their lateral movement and are delivered to the bundling device, where they are bound in bundles and dropped from the machine. In passing to the bundling mechanism each wire in turn passes under the counter-wheel, giving a partial revolution thereto, until when a desired number of wires have passed beneath such wheel the bundling mechanism is thereby set in motion.

It is apparent that if some of the wires were omitted from the series, leaving some of the spaces of the conveying-racks vacant, the bundling mechanism would continue to bind the usual number of wires in each bundle by reason of the fact that such mechanism would not be set in motion until the usual number of wires had passed beneath the counter-wheel.

While one series of wires is moving laterally through the machine another series thereof is being introduced longitudinally into the machine, ready to follow immediately after the first series.

What I claim as my invention, and desire to secure by Letters Patent of the United States, is—

1. In a bale-tie machine the combination of mechanism for feeding a series of wires into the machine; mechanism for cutting such wires after they have been introduced a desired distance into the machine; mechanism for supporting such wires while they are being introduced into the machine, and for releasing the same after they have been so introduced and severed; mechanism for imparting to such severed pieces an intermittent lateral movement; mechanism for forming a loop on one end of each of such wires, in succession, during such lateral movement; and mechanism for binding a plurality of such wires into a bundle substantially as set forth.

2. In a bale-tie machine the combination of mechanism for feeding a continuous wire into the machine; mechanism for cutting a piece from such wire after it has been introduced a desired distance into the machine; mechanism for supporting such wire and releasing the same after it has been so introduced and cut; mechanism for imparting to such severed wire an intermittent, lateral movement; and mechanism for forming a loop on the end of such wire during such lateral movement; substantially as described.

3. In a bale-tie machine the combination of means for introducing a series of wire strands a desired distance into the machine; means for simultaneously cutting pieces of wire from such strands, and delivering such severed wires to conveying mechanism; means for conveying such severed wires by an intermittent movement, laterally through and from the machine; and means for forming a loop on one end of each of such wires, in succession, during such lateral progress through the machine; substantially as shown and set forth.

4. In a bale-tie machine, mechanism for forming a loop on the end of a wire, consisting of the plunger 55, provided with a vertically-movable pin 62; twisting-head 67, provided with a pin 76, adapted to disappear therein; plate 71 provided with the groove 72; jaws 84, and means for operating said mechanism, substantially as shown and set forth.

5. In a bale-tie machine the combination of mechanism for feeding a series of wires into the machine; mechanism for simultaneously cutting such wires after they have attained a desired length, consisting of a series of knives 35, having handles 36 pivotally secured on the face-plate 17 in proximity thereto, a slide-bar 29, supporting a series of blocks 38, engaging the handles 36 of the knives, and means for moving the slide-bar 29 so as to cause the knives 35 to cross the ends of the tubes 16 through which the wires pass, whereby such wires are severed; mechanism for supporting such wires, and releasing the severed wires therefrom; mechanism for conveying such severed wires by an intermittent movement, laterally through and from the machine; and mechanism for forming a loop on each wire, in succession, as it passes through the machine; substantially as set forth.

6. In a bale-tie machine the combination of mechanism for feeding a series of wire strands into the machine; mechanism for guiding and supporting such wires during their progress into the machine, and for releasing the same after a desired length thereof has been obtained; such mechanism consisting of a series of guides 19, channeled to receive such wires, and adapted to open so as to permit such wires to drop therefrom; means for supporting such guides, and means for simultaneously opening such guides to permit the release of the wires therefrom; mechanism for simultaneously cutting such wires; mechanism for conveying such severed wires by an intermittent movement laterally through the machine; and mechanism for forming a loop on the end of each wire, in succession, during such lateral progress through the machine; substantially as described.

7. In a bale-tie machine the combination of mechanism for conveying the wires laterally through the machine, such mechanism consisting of a series of tracks 45, several pair of racks 46 and 47, one pair for each of the tracks 45, and means for imparting to such racks an eccentric intermittent movement; mechanism for forming a loop on one end of each wire as it passes through the machine; and means for delivering a plurality of wires simultaneously to the conveying mechanism above referred to; substantially as set forth.

8. In a bale-tie machine the combination of mechanism for introducing a series of wire strands into the machine; mechanism for cutting lengths of wire from such strands after they have been fed a desired distance into the machine; mechanism for delivering such severed lengths to loop-forming devices; and loop-forming mechanism, consisting of a plunger 55, provided with a vertically-movable pin 62, twisting-head 67, provided with a pin 76 adapted to disappear therein, plate 71 provided with groove 72, jaws 84, and means for operating such loop-forming mechanism; substantially as shown and set forth.

9. In a bale-tie machine, the combination of mechanism for introducing a series of wire strands a desired distance into the machine; mechanism for simultaneously cutting pieces of wire of a desired length from such strands, and delivering such severed wires to conveying mechanism; mechanism for conveying such severed wires by an intermittent movement laterally through such machine; mechanism for forming a loop on one end of each of such wires, in succession, during such lateral progress through the machine; and bundling mechanism, consisting of a series of brackets 100 having recesses 106, a shaft 102, supporting a series of plates 103, adapted to receive and hold the bale-tie wire; the disk 114 provided with knife 115, the disk 118 carrying the knife 120, the wire 107, coiling-finger 109, secured on the shaft 110, and means for supporting and operating such bundling mechanism; substantially as shown and described.

10. In a bale-tie machine wherein the wires are passed laterally through the machine, and formed into bale-ties during such passage, mechanism for forming the completed bale-ties into bundles of a desired size, consisting of the following parts in combination: a series of brackets 100 having recesses 106; a series of plates 103 supported on the shaft 102, and adapted to receive a desired number of completed bale-ties and force the same into a compact bundle in the recesses 106; a coiling-finger 109 secured on the shaft 110, and means for operating such shaft and coiling-finger at desired intervals; a disk 114 provided with the knife 115, and the disk 118 provided with the knife 120, such disks being adapted to draw out a piece of the wire 107 and cut such wire after the same has been coiled about the bale-tie; the rack 183 engaging a pinion 184 on a shaft 102; the hollow shaft 192 and cam 177 fixed thereon, such cam being adapted to impart to the rack 183 an eccentric reciprocating movement; the clutch 188, and means for rotating the same; the hanger 190, and yoke 191 supported thereby; the brace 195 pivotally secured to hanger 190; cam 196 on the cam 177, against which the end of the brace 195 rests, holding the clutch 188 normally out of engagement with the hollow shaft 192; the lever 199, and cam 207, adapted to operate such lever when such parts are vertically in line with one another; the rod 200; lever 201; and the counter-wheel 203, having teeth 204 and a lug 205, and adapted to engage the end of the lever 201, whereby the lever 199 is brought into line with the cam 207, the brace 195, and cam 196 disengaged, and the cam 177 set in motion; substantially as set forth.

In testimony whereof I affix my signature in presence of two witnesses.

PETER FRANTZ.

Witnesses:
   D. H. LINGEL,
   I. L. WEAVER.